(12) United States Patent
Hanson et al.

(10) Patent No.: US 10,592,908 B1
(45) Date of Patent: Mar. 17, 2020

(54) SYSTEM, METHOD, AND COMPUTER PROGRAM FOR PREVENTING EXCESSIVE CUSTOMER CARE

(71) Applicant: Amdocs Software Systems Limited, Dublin (IE)

(72) Inventors: Craig Dean Hanson, Elk Grove, CA (US); Joseph Patrick O'Hara, Poole (GB); Shanmugam Chinnappa Gounder, Ashburn, VA (US)

(73) Assignees: AMDOCS DEVELOPMENT LIMITED, Limassol (CY); AMDOCS SOFTWARE SYSTEMS LIMITED, Dublin (IE)

(*) Notice: Subject to any disclaimer, the term of this patent is extended or adjusted under 35 U.S.C. 154(b) by 1565 days.

(21) Appl. No.: 14/286,954

(22) Filed: May 23, 2014

Related U.S. Application Data

(60) Provisional application No. 61/827,682, filed on May 27, 2013.

(51) Int. Cl.
*G06Q 30/00* (2012.01)
*G06Q 10/00* (2012.01)
*G06Q 30/02* (2012.01)

(52) U.S. Cl.
CPC .......... *G06Q 30/016* (2013.01); *G06Q 10/20* (2013.01); *G06Q 30/0281* (2013.01)

(58) Field of Classification Search
USPC ........................................................ 705/304
See application file for complete search history.

(56) References Cited

U.S. PATENT DOCUMENTS 8,296,278 B2* 10/2012 Abraham .............. G06F 16/353
707/705
8,332,765 B2* 12/2012 Ergan .................. G06F 3/04895
715/764

(Continued)

OTHER PUBLICATIONS

14286954 EIC 3600 Search Results—Jul. 13, 2018 (Year: 2018).*

(Continued)

*Primary Examiner* — Amanda C Abrahamson
*Assistant Examiner* — Johnathan J Lindsey, III
(74) *Attorney, Agent, or Firm* — Zilka-Kotab, PC (57) ABSTRACT

A system, method, and computer program product are provided for preventing excessive customer care. In use, one or more service provider systems are monitored for at least one proactive care action provided to at least one of a plurality of customers. Further, one or more proactive care actions are detected in the one or more systems. Information associated with the detected one or more proactive care actions is stored. Additionally, one or more proactive customer care interactions associated with the detected one or more proactive care actions are identified. Information associated with the one or more proactive customer care interactions is stored. Furthermore, one or more self-service click through events associated with the detected one or more proactive care actions are detected. Information associated with the one or more self-service click through events is stored. Further, at least one customer care policy of a service provider associated with the one or more service provider systems is identified. Moreover, it is determined whether a determined proactive care action for at least one customer will result in over-care, based, at least in part, on the information associated with the detected one or more proactive care actions, the information associated with the one or more proactive customer care interactions, the informa- (Continued)

tion associated with the one or more self-service click through events, and the at least one customer care policy.

10 Claims, 4 Drawing Sheets

(56) References Cited

U.S. PATENT DOCUMENTS

| | | | | |
|---|---|---|---|---|
| 8,396,741 | B2* | 3/2013 | Kannan | G06Q 30/02 |
| | | | | 379/265.06 |
| 8,521,572 | B2* | 8/2013 | Hanson | G06Q 30/02 |
| | | | | 379/265.03 |
| 8,589,323 | B2* | 11/2013 | Keith, Jr. | G06F 11/26 |
| | | | | 706/46 |
| 8,788,875 | B2* | 7/2014 | Gerhart | G06Q 10/06 |
| | | | | 714/38.1 |
| 9,035,299 | B2* | 5/2015 | Uchida | H01L 27/1225 |
| | | | | 257/43 |
| 9,305,104 | B2* | 4/2016 | Wu | G06F 16/9535 |
| 9,305,299 | B1* | 4/2016 | Hanson | G06Q 30/016 |
| 9,307,085 | B1* | 4/2016 | Hanson | H04M 3/5235 |
| 10,096,029 | B1* | 10/2018 | Hanson | G06Q 30/016 |
| 2002/0143933 | A1* | 10/2002 | Hind | G06Q 30/02 |
| | | | | 709/224 |
| 2003/0028691 | A1* | 2/2003 | Burkes | G06F 1/24 |
| | | | | 710/15 |
| 2008/0107255 | A1* | 5/2008 | Geva | H04M 3/51 |
| | | | | 379/265.06 |
| 2011/0270771 | A1* | 11/2011 | Coursimault | G06Q 10/06 |
| | | | | 705/304 |
| 2011/0299676 | A1* | 12/2011 | Hanson | G06Q 30/02 |
| | | | | 379/265.03 |
| 2012/0143564 | A1* | 6/2012 | Li | G05B 23/0283 |
| | | | | 702/179 |
| 2013/0173479 | A1* | 7/2013 | Paz Salgado | G06Q 10/06 |
| | | | | 705/304 |
| 2014/0025588 | A1* | 1/2014 | Chinnappa | G06Q 30/01 |
| | | | | 705/304 |
| 2014/0052645 | A1* | 2/2014 | Hawes | G06Q 10/20 |
| | | | | 705/304 |

OTHER PUBLICATIONS

14286954 EIC 3600 (Fast and Focused) Search Results—Nov. 21, 2019 (Year: 2019).*

Chessell et al., "Smarter Analytics: Driving Customer Interactions with the IBM Next Best Action Solution," IBM Corp., 2012, pp. 1-36, retrieved from http://www.redbooks.ibm.com/redpapers/pdfs/redp4888.pdf.

* cited by examiner

SYSTEM, METHOD, AND COMPUTER PROGRAM FOR PREVENTING EXCESSIVE CUSTOMER CARE

CLAIM OF PRIORITY

This application claims the benefit of U.S. Provisional Application No. 61/827,682, filed May 27, 2013, the entire contents of which are incorporated herein by reference.

FIELD OF THE INVENTION

The present invention relates generally to customer care and specifically to proactive customer care.

BACKGROUND

Customer care is typically a reactive process. When seeking customer service, the customer typically initiates contact to a customer care center via a phone call, an e-mail, online chat or may submit an online request. Receipt of the request then leads to investigation of the request and ultimately to providing the necessary care. With the advent of monitoring of customer activity, the customer care process is transitioning from a reactive service to a proactive service.

However, providing proactive care in a uniform way to all customers may result in over-care, may cause customer care fatigue, and may run a risk of being ignored. Over-care refers to excessive proactive care actions that may cause care fatigue wherein the value of proactive care will not be appreciated by the customer. For example, over-care may include sending a customer multiple notifications regarding a particular unusual or suspicious bill.

There is thus a need for addressing these and/or other issues associated with the prior art.

SUMMARY

A system, method, and computer program product are provided for preventing excessive customer care. In use, one or more service provider systems are monitored for at least one proactive care action provided to at least one of a plurality of customers. Further, one or more proactive care actions are detected in the one or more systems. Information associated with the detected one or more proactive care actions is stored. Additionally, one or more proactive customer care interactions associated with the detected one or more proactive care actions are identified. Information associated with the one or more proactive customer care interactions is stored. Furthermore, one or more self-service click through events associated with the detected one or more proactive care actions are detected. Information associated with the one or more self-service click through events is stored. Further, at least one customer care policy of a service provider associated with the one or more service provider systems is identified. Moreover, it is determined whether a determined proactive care action for at least one customer will result in over-care, based, at least in part, on the information associated with the detected one or more proactive care actions, the information associated with the one or more proactive customer care interactions, the information associated with the one or more self-service click through events, and the at least one customer care policy.

DETAILED DESCRIPTION

Figure 1:
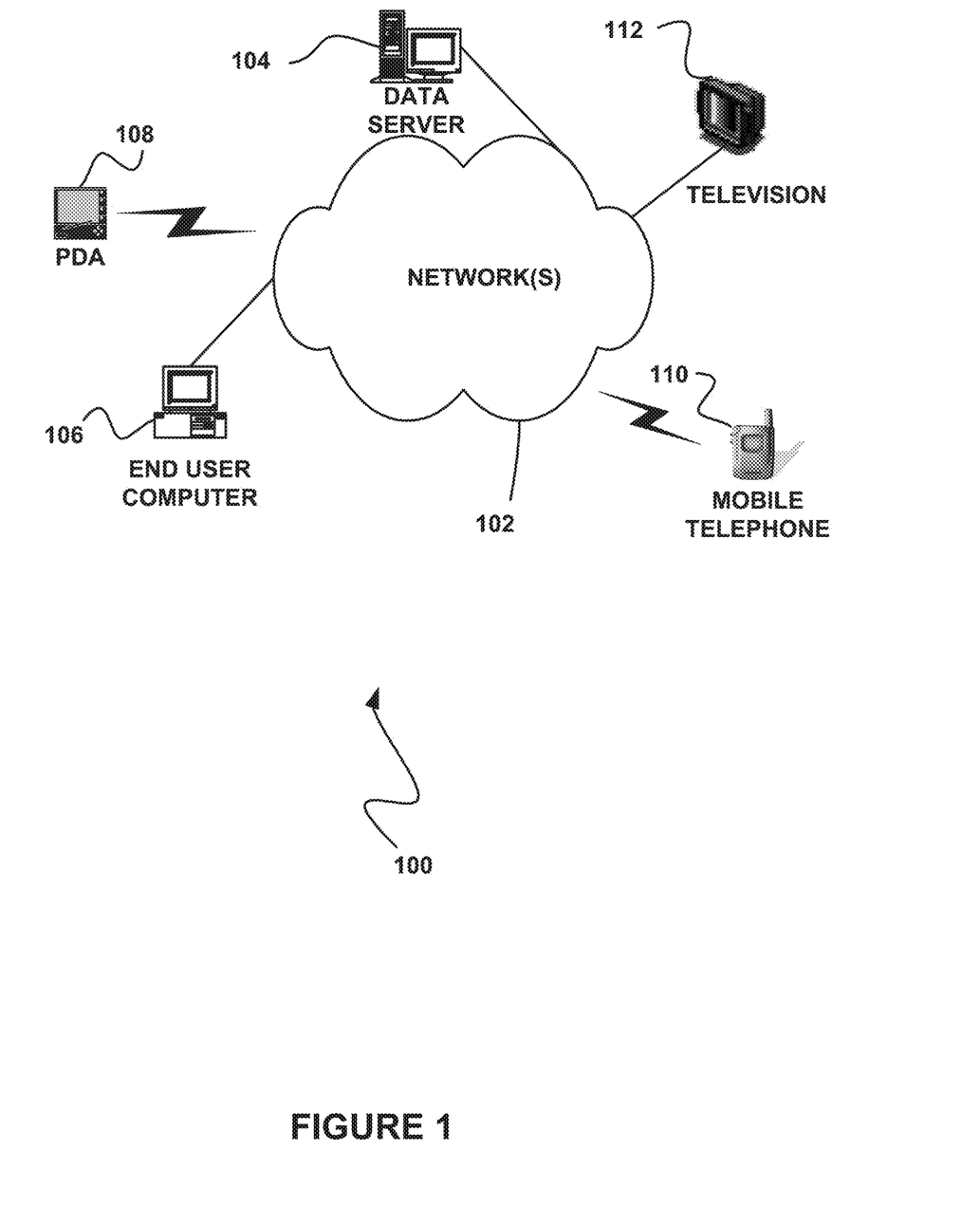
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
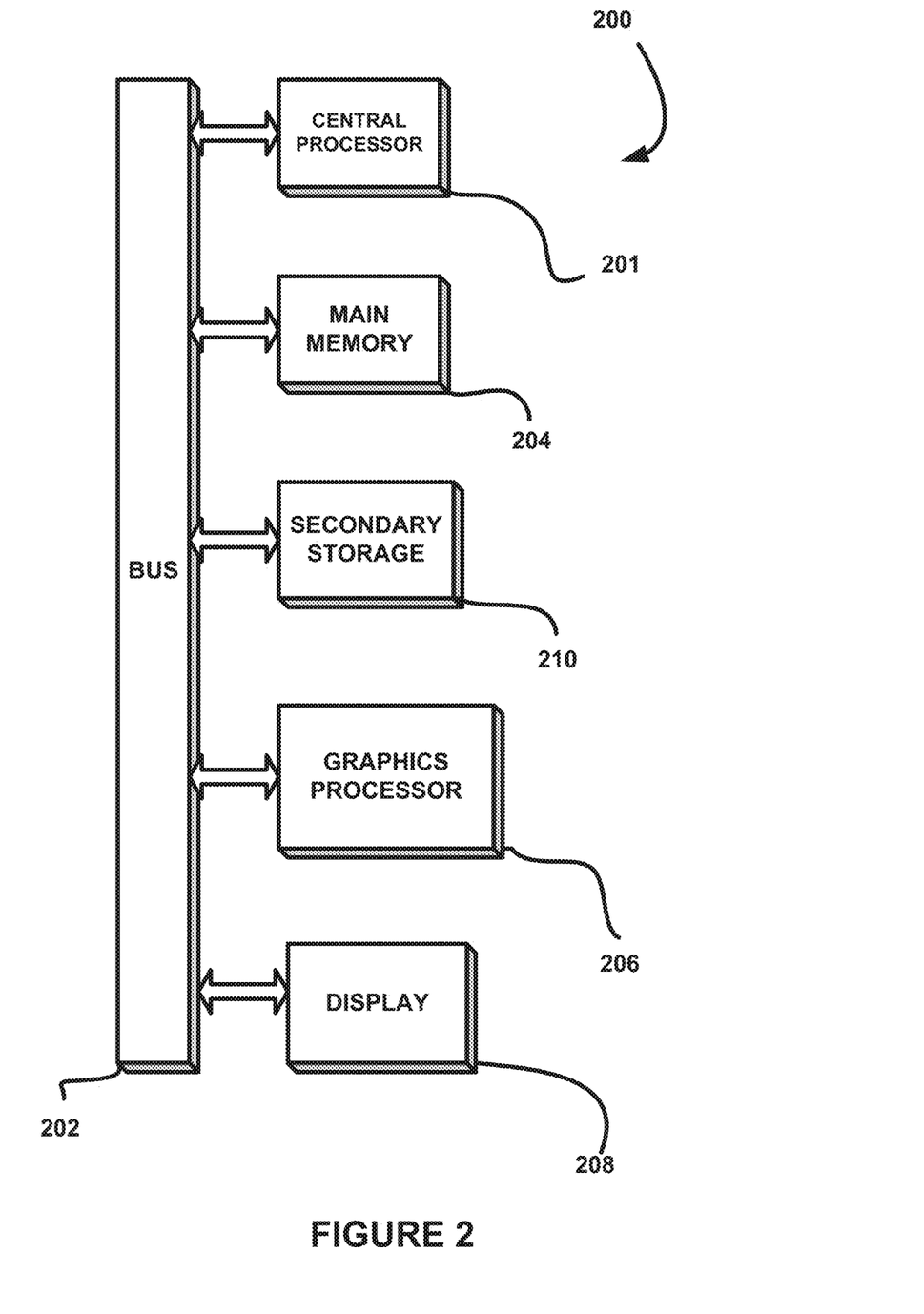
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
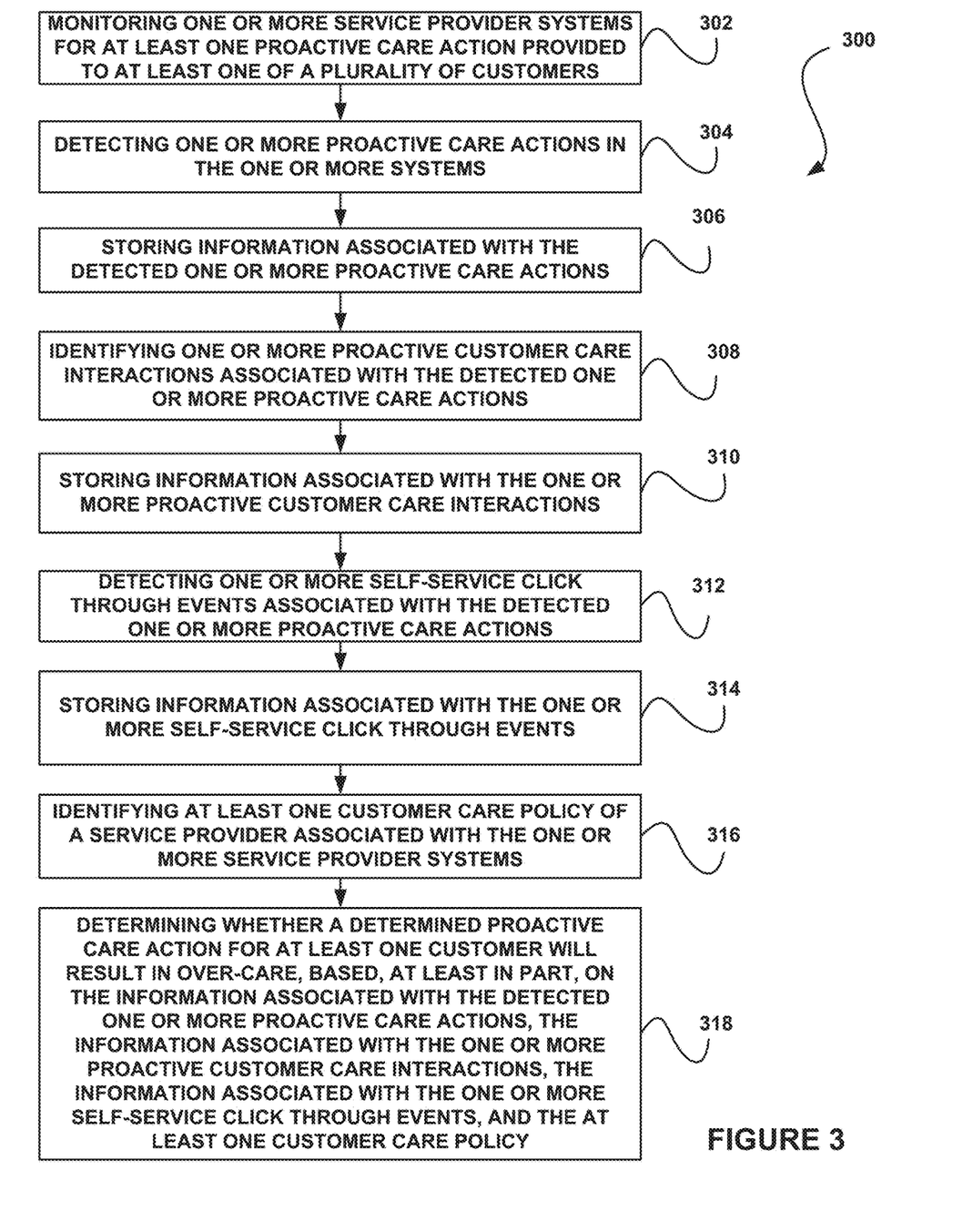
FIG. 3 illustrates a method for preventing excessive customer care, in accordance with one embodiment.

FIG. 3 illustrates a method 300 for preventing excessive customer care, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, one or more service provider systems are monitored for at least one proactive care action provided to at least one of a plurality of customers. See operation 302. The systems being monitored may include any system associated with a customer and/or a service/product provider. For example, in various embodiments, the systems may include billing systems, ordering systems, customer care systems, retailer systems, telecommunications provider systems, networks, and/or any other type of system associated with a customer of a service or product.

The proactive care action may include any action that attempts to address a perceived customer care issue or potential issue. For example, the proactive care action may include an attempt to resolve a customer issue associated with a product, a service, a device, and/or any other issue.

Further, one or more proactive care actions are detected in the one or more systems. See operation 304. In this case, the proactive care actions may be associated with a specific customer.

Information associated with the detected one or more proactive care actions is stored. See operation 306. The information may include any information associated with the proactive care actions, including a recording of the proactive care actions, a date associated with the action, a customer associated with the action, and/or various other information. Furthermore, the information may be stored in any database, repository, memory system, and/or a combination thereof.

Additionally, one or more proactive customer care interactions associated with the detected one or more proactive care actions are identified. See operation 308.

The customer care interactions may include any interaction between the customer and/or a service representative or product representative, etc. For example, the customer care interactions may be between the customer and a customer care representative (e.g. a technical representative, a quality representative, a satisfaction representative, etc.).

In one embodiment, the customer care interaction may include a telephone call. As another example, the customer care interaction may include an e-mail. As another example, the customer care interaction may include an online instant message exchange (e.g. a chat session, etc.).

As another example, the customer care interaction may include a problem ticket submitted by the customer. Further, the proactive customer care interactions may include any action initiated by the service provider in response to circumstances associated with the detected proactive care actions.

Information associated with the one or more proactive customer care interactions is stored. See operation 310. The information may include any information associated with the proactive customer care interaction, including a recording of the proactive customer care interaction, a date associated with the interaction, a customer associated with the interaction, and/or various other information. Furthermore, the information may be stored in any database, repository, memory system, and/or a combination thereof.

As shown further, one or more self-service click through events associated with the detected one or more proactive care actions are detected. See operation 312. The self-service click through events may be associated with any self-service remediation model.

The service provider may present the self-service model to the customer in an attempt to remedy an outstanding issue, etc. The self-service click through events may be associated with any computer program intended to address a customer issue. Further, the self-service program may include an online program (e.g. from a website, etc.).

In one embodiment, the self-service click through events related to the proactive care actions may be monitored in order to evaluate and identify whether the customer has already received the care that is needed through a self-service channel.

Information associated with the one or more self-service click through events is stored. See operation 314. The information may include any information associated with the self-service click through events, including a storage of the self-service click through events and a result of the self-service click through events, etc. Furthermore, the information may be stored in any database, repository, memory system, and/or a combination thereof.

Further, at least one customer care policy of a service provider associated with the one or more service provider systems is identified. See operation 316. The customer care policy may include any type of policy.

In one embodiment, identifying the customer care policy of the service provider associated with the service provider systems may include identifying the customer care policy in a customer care policy store. In this case, the customer care policy store may include any database, repository, memory system, and/or a combination thereof.

As shown further in FIG. 3, it is determined whether a determined proactive care action for at least one customer will result in over-care, based, at least in part, on the information associated with the detected one or more proactive care actions, the information associated with the one or more proactive customer care interactions, the information associated with the one or more self-service click through events, and/or the at least one customer care policy. See operation 318.

In the context of the present description, over-care includes implementing excessive proactive care actions that may cause care fatigue such that the value of proactive care will not be appreciated by the customer. For example, over-care may include sending a customer multiple notifications regarding a particular unusual or suspicious bill, etc.

In one embodiment, the customer care policy of the service provider may be utilized to determine whether the determined proactive care action for the customer will result in over-care based on severity or threshold associated with the determined proactive care action. For example, if the determined proactive care action is a high severity level or a high priority level, the threshold for over-care may be higher.

Further, in one embodiment, the method 300 may further include determining that the determined proactive care action for the customer may result in over-care if the determined proactive care action is implemented within a predetermined time period. In this case, the determined proactive care action for the customer may be implemented after the expiration of the predetermined time period, if it is determined to still be appropriate.

The determined proactive care action may include any action that attempts to address the perceived customer care issue or potential issue. For example, the determined proactive care action may include an attempt to resolve a customer issue associated with a product, a service, a device, bill, and/or any other issue.

Of course, if it is determined that the determined proactive care action for the customer will not result in over-care, the determined proactive care action for the customer may be implemented. On the other hand, if it is determined that the determined proactive care action for the customer will result in over-care, the determined proactive care action for the customer may not be implemented, or implementation may be delayed for a predetermined period of time (or until a predefined event occurs, etc.).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
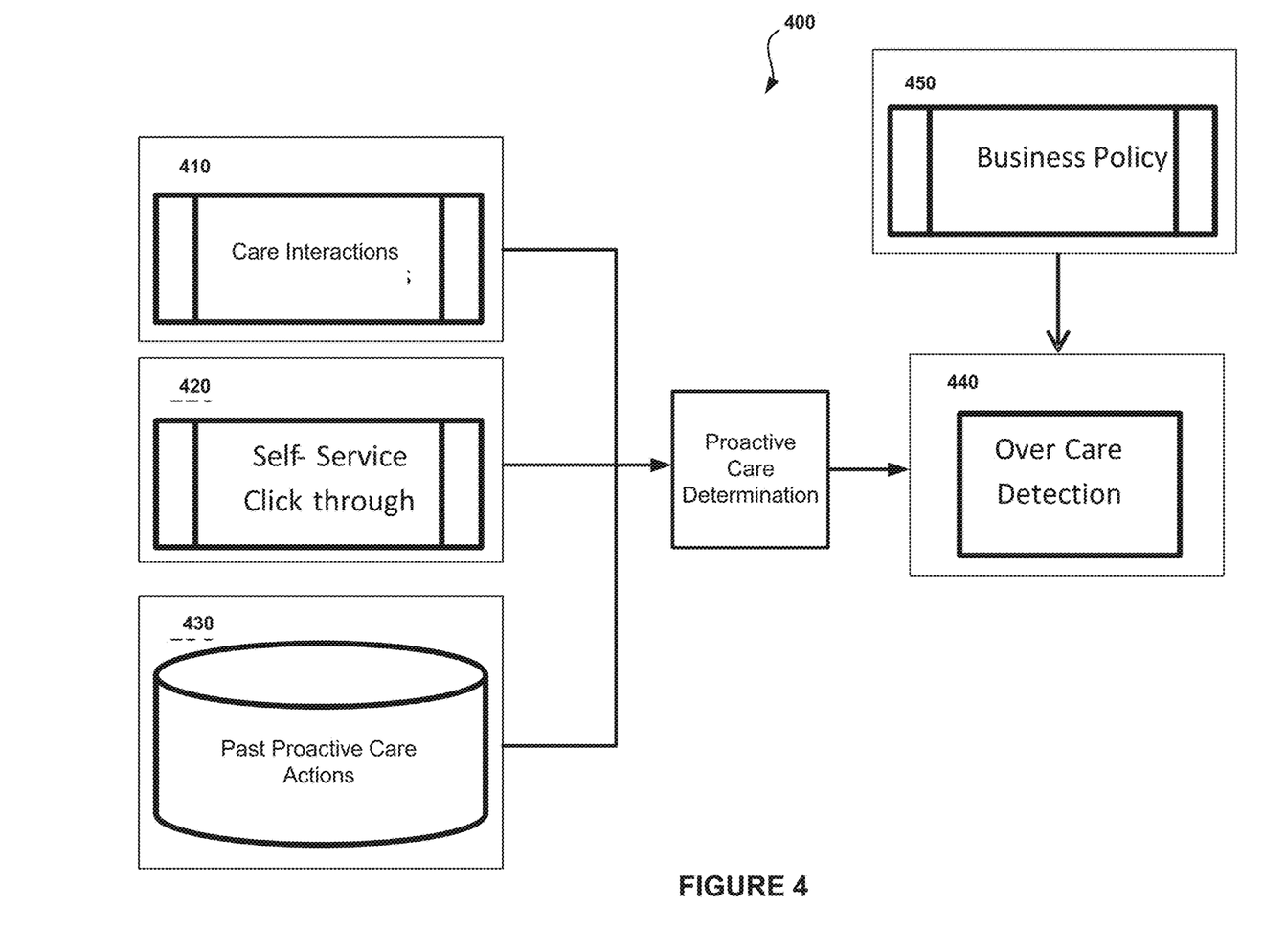
FIG. 4 illustrates system for preventing excessive customer care, in accordance with one embodiment.

FIG. 4 illustrates system 400 for preventing excessive customer care, in accordance with one embodiment. As an option, the system 400 may be implemented in the context of the details of FIGS. 1-3. Of course, however, the system 400 may be implemented in the context of any desired environment. Further, the aforementioned definitions may equally apply to the description below.

As shown in FIG. 4, the system 400 includes proactive care action monitoring functionality 430, which is operable for monitoring and recording proactive care actions provided to customers by a service provider, over time.

The system 400 also includes proactive care interaction monitoring functionality 410 which is operable for monitoring and recording the care interactions of customers. These interactions correspond to the proactive care actions recorded by the proactive care action monitoring functionality 430. The proactive care interactions may include, for example, a call, an e-mail, a chat, a problem ticket submitted by the customer.

The system 400 also includes self-service click through event monitoring functionality 420 operable for monitoring and recording the self-service click through events related to the care actions in order to evaluate and identify whether the customer has already received the care that is needed through a self-service channel.

For example, if a smart phone restarted automatically after installing an application A, and the customer subsequently visited a self-service web site and searched for an article regarding a known issue with application A and the customer's device type, the self-service click through event monitoring functionality 420 may determine that the customer has already received care.

The system 400 also includes over-care detection functionality 440 operable for employing information collected by the proactive care action monitoring functionality 430, the proactive care interaction monitoring functionality 410, the self-service click through event monitoring functionality 420, and customer care policies stored in a customer care policy store 450 in order to identify whether a proactive care action will result in over-care.

The service provider's customer care policies may dictate that the system 400 should perform proactive action for the customer for certain issues based on severity or a threshold, irrespective of whether the customer has already received care through other channels. For example, even though the customer has read about the next steps to resolve the device issue, a business policy may dictate that the system 400 should proactively perform those next steps automatically.

Additionally, the business policy may indicate a period within which multiple care actions should not be executed. For example, if a customer was notified three days prior regarding a device issue, another notification should not be sent on a present day regarding a different device issue.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for monitoring, by a system, one or more service provider systems for proactive care actions taken by the one or more service provider systems to resolve issues of a plurality of customers;
   computer code for detecting, by the system from the monitoring, one or more of the proactive care actions taken by the one or more service provider systems to resolve a particular issue associated with a particular customer of the plurality of customers;
   computer code for storing, by the system, information associated with the detected one or more proactive care actions, the information associated with the detected one or more proactive care actions including:
     a recording of each proactive care action of the detected one or more proactive care actions,
     a date associated with each proactive care action of the detected one or more proactive care actions, and
     an identification of the particular customer;
   computer code for identifying, by the system, one or more proactive customer care interactions associated with the detected one or more proactive care actions, the one or more proactive customer care interactions including correspondence between the particular customer and a customer care representative;
   computer code for storing, by the system, information associated with the one or more proactive customer care interactions, the information associated with the one or more proactive customer care interactions including:
     a recording of each proactive customer care interaction of the proactive customer care interactions,
     a date associated with each proactive customer care interaction of the proactive customer care interactions, and
     an identification of the particular customer;
   computer code for detecting, by the system, one or more self-service click through events associated with the detected one or more proactive care actions, the one or more self-service click through events being performed by the particular customer through a computer program to address the particular issue;
   computer code for storing, by the system, information associated with the detected one or more self-service click through events, the information associated with the detected one or more self-service click through events including:
     a recording of the self-service click through events, and
     a result of the self-service click through events including an indication of whether the particular customer received care needed to address the particular issue;
   computer code for identifying, by the system, at least one customer care policy of a service provider associated with the one or more service provider systems, the at least one customer care policy dictating conditions in which taking an additional proactive care action would result in over-care for the particular issue of the particular customer;
   computer code for determining, by the system, whether the conditions of the customer care policy are met;
   computer code for, when the system determines that the conditions in which the additional proactive care action would result in over-care for the particular issue of the particular customer are met, not implementing, by the system, the additional proactive care action to address the particular issue of the particular customer; and computer code for, when the system determines that the conditions in which the additional proactive care action would result in over-care for the particular issue of the particular customer are not met, implementing, by the system, the additional proactive care action to address the particular issue of the particular customer.

2. The computer program product of claim 1, wherein the computer program product is operable such that the one or more proactive customer care interactions include a telephone call.

3. The computer program product of claim 1, wherein the computer program product is operable such that the one or more proactive customer care interactions include an e-mail.

4. The computer program product of claim 1, wherein the computer program product is operable such that the one or more proactive customer care interactions include an online instant message exchange.

5. The computer program product of claim 1, wherein the computer program product is operable such that identifying the at least one customer care policy of the service provider associated with the one or more service provider systems includes identifying the at least one customer care policy in a customer care policy store.

6. The computer program product of claim 1, wherein the particular issue of the particular customer is with a service.

7. The computer program product of claim 1, wherein the particular issue of the particular customer is with a device.

8. The computer program product of claim 1, wherein the conditions include a current time being within a predetermined time period from a time that a notification was previously sent to the particular customer regarding a different issue.

9. A method, comprising:
monitoring, by a system, one or more service provider systems for proactive care actions taken by the one or more service provider systems to resolve issues of a plurality of customers;
detecting, by the system from the monitoring, one or more of the proactive care actions taken by the one or more service provider systems to resolve a particular issue associated with a particular customer of the plurality of customers;
storing, by the system, information associated with the detected one or more proactive care actions, the information associated with the detected one or more proactive care actions including:
a recording of each proactive care action of the detected one or more proactive care actions,
a date associated with each proactive care action of the detected one or more proactive care actions, and
an identification of the particular customer;
identifying, by the system, one or more proactive customer care interactions associated with the detected one or more proactive care actions, the one or more proactive customer care interactions including correspondence between the particular customer and a customer care representative;
storing, by the system, information associated with the one or more proactive customer care interactions, the information associated with the one or more proactive customer care interactions including:
a recording of each proactive customer care interaction of the proactive customer care interactions,
a date associated with each proactive customer care interaction of the proactive customer care interactions, and
an identification of the particular customer;

detecting, by the system, one or more self-service click through events associated with the detected one or more proactive care actions, the one or more self-service click through events being performed by the particular customer through a computer program to address the particular issue;
storing, by the system, information associated with the detected one or more self-service click through events, the information associated with the detected one or more self-service click through events including:
a recording of the self-service click through events, and
a result of the self-service click through events including an indication of whether the particular customer received care needed to address the particular issue;
identifying, by the system, at least one customer care policy of a service provider associated with the one or more service provider systems, the at least one customer care policy dictating conditions in which taking an additional proactive care action would result in over-care for the particular issue of the particular customer;
determining, by the system, whether the conditions of the customer care policy are met;
when the system determines that the conditions in which the additional proactive care action would result in over-care for the particular issue of the particular customer are met, not implementing, by the system, the additional proactive care action to address the particular issue of the particular customer; and
when the system determines that the conditions in which the additional proactive care action would result in over-care for the particular issue of the particular customer are not met, implementing, by the system, the additional proactive care action to address the particular issue of the particular customer.

10. A system comprising:
a memory system; and
one or more processing cores coupled to the memory system and that are each configured to:
monitor one or more service provider systems for proactive care actions taken by the one or more service provider systems to resolve issues of a plurality of customers;
detect, from the monitoring, one or more of the proactive care actions taken by the one or more service provider systems to resolve a particular issue associated with a particular customer of the plurality of customers;
store information associated with the detected one or more proactive care actions, the information associated with the detected one or more proactive care actions including:
a recording of each proactive care action of the detected one or more proactive care actions,
a date associated with each proactive care action of the detected one or more proactive care actions, and
an identification of the particular customer;
identify one or more proactive customer care interactions associated with the detected one or more proactive care actions, the one or more proactive customer care interactions including correspondence between the particular customer and a customer care representative;
store information associated with the one or more proactive customer care interactions, the information associated with the one or more proactive customer care interactions including:
- a recording of each proactive customer care interaction of the proactive customer care interactions,
- a date associated with each proactive customer care interaction of the proactive customer care interactions, and
- an identification of the particular customer;

detect one or more self-service click through events associated with the detected one or more proactive care actions, the one or more self-service click through events being performed by the particular customer through a computer program to address the particular issue;

store information associated with the detected one or more self-service click through events, the information associated with the detected one or more self-service click through events including:
- a recording of the self-service click through events, and
- a result of the self-service click through events including an indication of whether the particular customer received care needed to address the particular issue;

identify at least one customer care policy of a service provider associated with the one or more service provider systems, the at least one customer care policy dictating conditions in which taking an additional proactive care action would result in over-care for the particular issue of the particular customer;

determine whether the conditions of the customer care policy are met;

when the system determines that the conditions in which the additional proactive care action would result in over-care for the particular issue of the particular customer are met, not implementing the additional proactive care action to address the particular issue of the particular customer; and when the system determines that the conditions in which the additional proactive care action would result in over-care for the particular issue of the particular customer are not met, implementing the additional proactive care action to address the particular issue of the particular customer.

* * * * *